(12) United States Patent
Ma et al.

(10) Patent No.: US 12,041,417 B2
(45) Date of Patent: Jul. 16, 2024

(54) HEARING DEVICE WITH OWN-VOICE DETECTION

(71) Applicant: GN Hearing A/S, Ballerup (DK)

(72) Inventors: Changxue Ma, Barrington, IL (US); Srdjan Petrovic, Lake Villa, IL (US)

(73) Assignee: GN HEARING A/S, Ballerup (DK)

( * ) Notice: Subject to any disclaimer, the term of this patent is extended or adjusted under 35 U.S.C. 154(b) by 16 days.

(21) Appl. No.: 17/831,360

(22) Filed: Jun. 2, 2022

(65) Prior Publication Data

US 2023/0396936 A1 Dec. 7, 2023

(51) Int. Cl.
*H04R 25/00* (2006.01)
*G10L 17/02* (2013.01)
*G10L 19/02* (2013.01)

(52) U.S. Cl.
CPC .............. *H04R 25/43* (2013.01); *G10L 17/02* (2013.01); *G10L 19/02* (2013.01); *H04R 25/407* (2013.01); *H04R 25/507* (2013.01); *H04R 2225/39* (2013.01); *H04R 2225/41* (2013.01); *H04R 2225/61* (2013.01)

(58) Field of Classification Search
None
See application file for complete search history.

(56) References Cited

U.S. PATENT DOCUMENTS

| 9,208,772 | B2 | 12/2015 | Yamkovoy |
| 10,403,306 | B2 | 9/2019 | Kamkar Parsi et al. |
| 2012/0263317 | A1 | 10/2012 | Shin et al. |
| 2013/0163775 | A1 | 6/2013 | Yamkovoy |
| 2013/0275128 | A1 | 10/2013 | Claussen et al. |
| 2013/0289912 | A1 | 10/2013 | Liu et al. |
| 2016/0080873 | A1* | 3/2016 | Guo ..................... H04R 25/405 381/313 |
| 2016/0105751 | A1 | 4/2016 | Zurbruegg et al. |

(Continued)

FOREIGN PATENT DOCUMENTS

| EP | 3328097 | 5/2018 |
| EP | 3484173 | 5/2019 |

(Continued)

OTHER PUBLICATIONS

Extended European Search Report for EP Patent Appln. No. 23173295.9 dated Oct. 31, 2023.

*Primary Examiner* — Mark Fischer
(74) *Attorney, Agent, or Firm* — Vista IP Law Group, LLP

(57) ABSTRACT

A hearing device comprises a first microphone for provision of a first microphone input signal, and a second microphone for provision of a second microphone input signal; a voice detector module for processing the first and second microphone input signals, the voice detector module configured to detect own-voice of a user; a processor for provision of an electrical output signal; and a receiver for providing an audio output signal, wherein the voice detector module is configured to determine a direction parameter indicative of a direction of a sound source based on first and/or second microphone input signal; determine whether a direction criterion based on the direction parameter is satisfied; determine a first distance parameter indicative of a distance to the sound source; determine whether a distance criterion based on the first distance parameter is satisfied; and provide a voice detector output.

21 Claims, 4 Drawing Sheets

(56) References Cited

U.S. PATENT DOCUMENTS

| | | |
|---|---|---|
| 2017/0256272 A1 | 9/2017 | Kamkar Parsi et al. |
| 2018/0146307 A1 | 5/2018 | Petersen et al. |
| 2018/0151346 A1 | 5/2018 | Blanquart |
| 2018/0350394 A1* | 12/2018 | Saffran .................. G10L 25/51 |
| 2019/0075406 A1 | 3/2019 | Petersen et al. |
| 2019/0149921 A1 | 5/2019 | Pedersen et al. |
| 2019/0174235 A1* | 6/2019 | Ma ....................... H04R 25/554 |
| 2020/0128335 A1 | 4/2020 | El Guindi |
| 2020/0314565 A1* | 10/2020 | Sigwanz ................ H04R 25/40 |
| 2021/0274296 A1 | 9/2021 | Rohde et al. |
| 2022/0091674 A1* | 3/2022 | Kemmerer ............... H04R 3/04 |

FOREIGN PATENT DOCUMENTS

| | | |
|---|---|---|
| EP | 3618456 | 3/2020 |
| WO | WO 2014/194932 | 12/2014 |
| WO | WO 2016/078786 | 5/2016 |

* cited by examiner

HEARING DEVICE WITH OWN-VOICE DETECTION

FIELD

The present disclosure relates to a hearing device and hearing system with own-voice detection.

BACKGROUND

Hearing devices help their users to capture and process signals from the surrounding talkers and other sources. Beamforming technology based on a microphone array is often applied to enhance the targeted signal and suppress the interference sources. These sources are often at least 1 to 2 meters away from the user, which is called far-field sources. Of course, the hearing devices also capture the user's own voice and process the user's own voice, which often makes the user uncomfortable due to an unnatural and loud perception. Challenges still remain in detection of a user's own voice in hearing devices.

SUMMARY

Accordingly, there is a need for hearing devices with improved own voice detection.

Accordingly, a hearing device is disclosed, the hearing device comprising a set of microphones including a first microphone for provision of a first microphone input signal, and a second microphone for provision of a second microphone input signal; a voice detector module connected to the first microphone and the second microphone for processing the first microphone input signal and the second microphone input signal, the voice detector module configured to detect own-voice of a user of the hearing device; a processor for processing the first microphone input signal and the second microphone input signal for provision of an electrical output signal based on the first microphone input signal and the second microphone input signal; and a receiver for converting the electrical output signal to an audio output signal. The voice detector module is optionally configured to determine a direction parameter indicative of a direction of a sound source based on one or more microphone input signals from microphones of the set of microphones and determine whether a direction criterion based on the direction parameter is satisfied. The voice detector module is optionally configured to determine a first distance parameter, e.g. indicative of a distance to the sound source, based on one or more microphone input signals, such as the first microphone input signal and/or the second microphone input signal, from microphones of the set of microphones and optionally determine whether a distance criterion based on the first distance parameter is satisfied. The voice detector module is optionally configured to, e.g. in accordance with a determination that the direction criterion and/or the distance criterion are satisfied, provide a voice detector output indicative of detection of own-voice to the processor.

A hearing device is disclosed, the hearing device comprising a set of microphones including a first microphone for provision of a first microphone input signal, and a second microphone for provision of a second microphone input signal; a voice detector module connected to the first microphone and the second microphone for processing the first microphone input signal and the second microphone input signal, the voice detector module configured to detect own-voice of a user of the hearing device; a processor for processing the first microphone input signal and the second microphone input signal for provision of an electrical output signal based on the first microphone input signal and the second microphone input signal; and a receiver for converting the electrical output signal to an audio output signal, wherein the voice detector module is configured to determine a first distance parameter indicative of a distance to the sound source based on one or more microphone input signals from microphones of the set of microphones; provide a voice detector output indicative of detection of own-voice to the processor, wherein to provide a voice detector output indicative of detection of own-voice comprises to apply a machine learning model taking the first distance parameter as input and providing as output the voice detector output indicative of detection of own-voice.

Further, a hearing system is disclosed, the hearing system comprising a first hearing device and a second hearing device, wherein the first hearing device is a hearing device as disclosed herein. The second hearing device may be a hearing device as disclosed herein.

The present disclosure allows for improved and more robust own voice detection, which in turn allows improved processing of microphone input signals, e.g. by avoiding over-amplification of a user's own voice.

BRIEF DESCRIPTION OF THE DRAWINGS

The above and other features and advantages will become readily apparent to those skilled in the art by the following detailed description of example embodiments thereof with reference to the attached drawings, in which.

DETAILED DESCRIPTION

Figure 1:
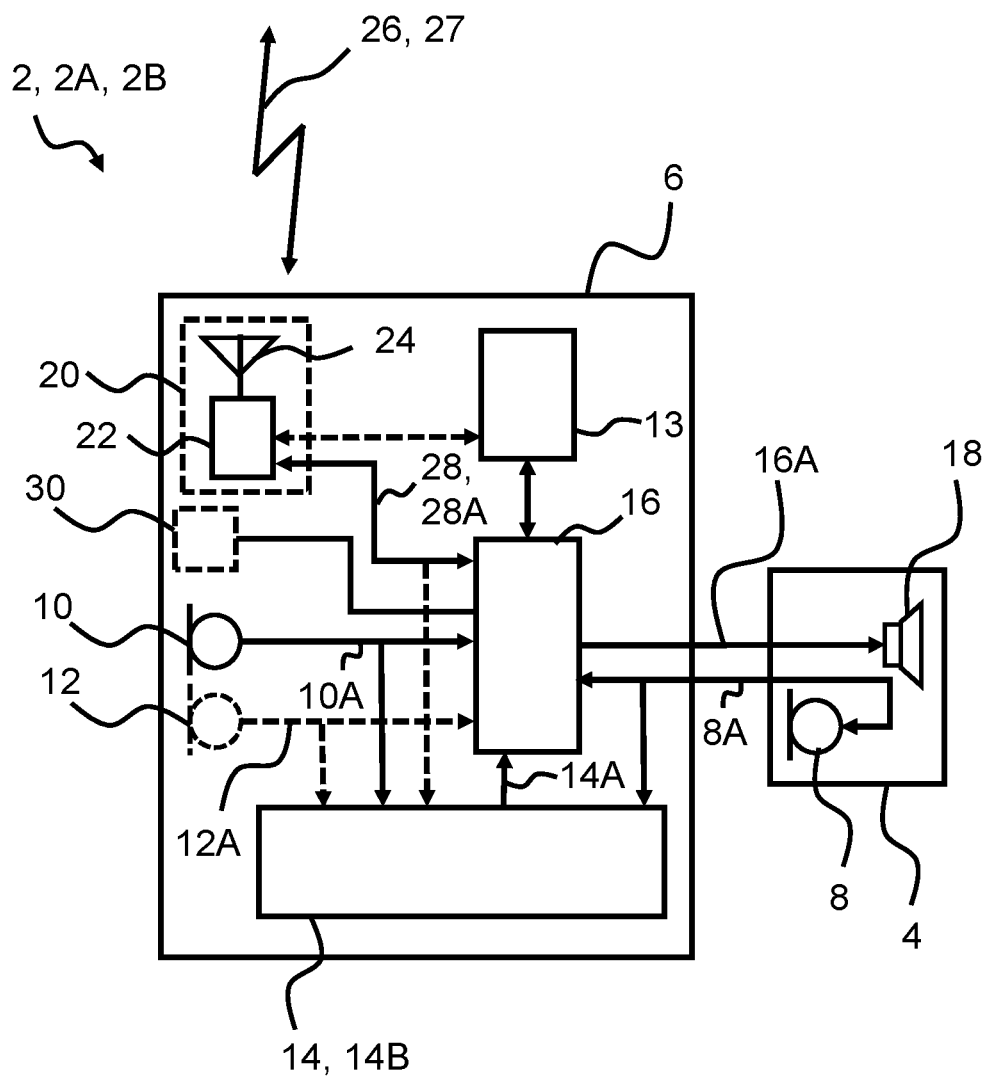
FIG. 1 schematically illustrates an example hearing device according to the disclosure, FIG. 2 schematically illustrates an example voice detector module according to the disclosure, FIG. 3 schematically illustrates an example voice detector module according to the disclosure.

Various example embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A hearing device is disclosed. The hearing device may be arranged at the user's ear, on the user's ear, over the user's ear, in the user's ear, in the user's ear canal, behind the user's ear and/or in the user's concha during use, i.e., the hearing device is configured to be worn in, on, over and/or at the user's ear. The user may wear two hearing devices, one hearing device at each ear. The two hearing devices may be connected, such as wirelessly connected and/or connected by wires, such as a binaural hearing aid system.

The hearing device may be a hearable such as a headset, headphone, earphone, earbud, hearing aid, a personal sound amplification product (PSAP), an over-the-counter (OTC)

hearing device, a hearing protection device, a one-size-fits-all hearing device, a custom hearing device or another head-wearable hearing device. Hearing devices can include both prescription devices and non-prescription devices.

The hearing device may be embodied in various housing styles or form factors. Some of these form factors are Behind-the-Ear (BTE) hearing device, Receiver-in-Canal (RIC) hearing device, Receiver-in-Ear (RIE) hearing device or Microphone-and-Receiver-in-Ear (MaRIE) hearing device. These devices may comprise a BTE unit also configured to be worn behind the ear of the user and an in the ear (ITE) unit configured to be inserted partly or fully into the user's ear canal. Generally, the BTE unit may comprise at least one input transducer, a power source and a processing unit. The term BTE hearing device refers to a hearing device where the receiver, i.e. the output transducer, is comprised in the BTE unit and sound is guided to the ITE unit via a sound tube connecting the BTE and ITE units, whereas the terms RIE, RIC and MaRIE hearing devices refer to hearing devices where the receiver may be comprised in the ITE unit, which is coupled to the BTE unit via a connector cable or wire configured for transferring electric signals between the BTE and ITE units.

Some of these form factors are In-the-Ear (ITE) hearing device, Completely-in-Canal (CIC) hearing device or Invisible-in-Canal (IIC) hearing device. These hearing devices may comprise an ITE unit, wherein the ITE unit may comprise at least one input transducer, a power source, a processing unit and an output transducer. These form factors may be custom devices, meaning that the ITE unit may comprise a housing having a shell made from a hard material, such as a hard polymer or metal, or a soft material such as a rubber-like polymer, molded to have an outer shape conforming to the shape of the specific user's ear canal.

Some of these form factors are earbuds, on the ear headphones or over the ear headphones. The person skilled in the art is well aware of different kinds of hearing devices and of different options for arranging the hearing device in, on, over and/or at the ear of the hearing device wearer. The hearing device (or pair of hearing devices) may be custom fitted, standard fitted, open fitted and/or occlusive fitted.

In one or more examples, the hearing device may comprise one or more input transducers. The one or more input transducers comprises a set of microphones including one or more microphones. The one or more input transducers may comprise one or more vibration sensors configured for detecting bone vibration. The one or more input transducer(s) may be configured for converting an acoustic signal into a first electric input signal. The first electric input signal may be an analogue signal. The first electric input signal may be a digital signal. The one or more input transducer(s) may be coupled to one or more analogue-to-digital converter(s) configured for converting the analogue first input signal into a digital first input signal.

In one or more examples, the hearing device may comprise one or more antenna(s) configured for wireless communication. The one or more antenna(s) may comprise an electric antenna. The electric antenna may be configured for wireless communication at a first frequency. The first frequency may be above 800 MHz, preferably a wavelength between 900 MHz and 6 GHz. The first frequency may be 902 MHz to 928 MHz. The first frequency may be 2.4 to 2.5 GHz. The first frequency may be 5.725 GHz to 5.875 GHz. The one or more antenna(s) may comprise a magnetic antenna. The magnetic antenna may comprise a magnetic core. The magnetic antenna may comprise a coil. The coil may be coiled around the magnetic core. The magnetic antenna may be configured for wireless communication at a second frequency. The second frequency may be below 100 MHz. The second frequency may be between 9 MHz and 15 MHz.

In one or more examples, the hearing device may comprise one or more wireless communication unit(s). The one or more wireless communication unit(s) may comprise one or more wireless receiver(s), one or more wireless transmitter(s), one or more transmitter-receiver pair(s) and/or one or more transceiver(s). At least one of the one or more wireless communication unit(s) may be coupled to the one or more antenna(s). The wireless communication unit may be configured for converting a wireless signal received by at least one of the one or more antenna(s) into a second electric input signal. The hearing device may be configured for wired/wireless audio communication, e.g. enabling the user to listen to media, such as music or radio and/or enabling the user to perform phone calls.

In one or more examples, the wireless signal may originate from one or more external source(s) and/or external devices, such as spouse microphone device(s), wireless audio transmitter(s), smart computer(s) and/or distributed microphone array(s) associated with a wireless transmitter. The wireless input signal(s) may origin from another hearing device, e.g., as part of a binaural hearing system and/or from one or more accessory device(s), such as a smartphone and/or a smart watch.

In one or more examples, the hearing device may include a processor. The processor may be configured for processing the first and/or second electric input signal(s). The processing may comprise compensating for a hearing loss of the user, i.e., apply frequency dependent gain to input signals in accordance with the user's frequency dependent hearing impairment. The processing may comprise performing one or more of feedback cancelation, beamforming, tinnitus reduction/masking, noise reduction, noise cancellation, speech recognition, bass adjustment, treble adjustment, and processing of user input. The processor may be a processor, an integrated circuit, an application, functional module, etc. The processor may be implemented in a signal-processing chip or a printed circuit board (PCB). The processor may be configured to provide a (first) electric output signal based on the processing of the first and/or second electric input signal(s). The processor unit may be configured to provide a second electric output signal. The second electric output signal may be based on the processing of the first and/or second electric input signal(s).

In one or more examples, the hearing device may comprise an output transducer. The output transducer may be coupled to the processor. The output transducer may be a receiver. It is noted that in this context, a receiver may be a loudspeaker, whereas a wireless receiver may be a device configured for processing a wireless signal. The receiver may be configured for converting the (first) electric output signal into an acoustic output signal also denoted audio output signal. The output transducer may be coupled to the processor unit via the magnetic antenna. The output transducer/receiver may be comprised in an ITE unit or in an earpiece, e.g. Receiver-in-Ear (RIE) unit or Microphone-and-Receiver-in-Ear (MaRIE) unit, of the hearing device. One or more of the input transducer(s) may be comprised in an ITE unit or in an earpiece.

In one or more examples, the wireless communication unit may be configured for converting the second electric output signal into a wireless output signal. The wireless output signal may comprise synchronization data. The wireless communication unit may be configured for transmitting the wireless output signal via at least one of the one or more antennas.

In one or more examples, the hearing device may comprise a digital-to-analogue converter configured to convert the first electric output signal, the second electric output signal and/or the wireless output signal into an analogue signal.

In one or more examples, the hearing device may comprise a vent. A vent is a physical passageway such as a canal or tube primarily placed to offer pressure equalization across a housing placed in the ear such as an ITE hearing device, an ITE unit of a BTE hearing device, a CIC hearing device, a RIE hearing device, a RIC hearing device, a MaRIE hearing device or a dome tip/earmold. The vent may be a pressure vent with a small cross section area, which is preferably acoustically sealed. The vent may be an acoustic vent configured for occlusion cancellation. The vent may be an active vent enabling opening or closing of the vent during use of the hearing device. The active vent may comprise a valve.

In one or more examples, the hearing device may comprise a power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil. The charging coil may be provided by the magnetic antenna.

In one or more examples, the hearing device may comprise a memory, including volatile and non-volatile forms of memory.

The hearing device may comprise a set of microphones. The set of microphones may comprise one or more microphones. The set of microphones comprises a first microphone for provision of a first microphone input signal also denoted m_1 and/or a second microphone for provision of a second microphone input signal also denoted m_2. The set of microphones may comprise N microphones for provision of N microphone signals, wherein N is an integer in the range from 1 to 10. In one or more example hearing devices, the number N of microphones is two, three, four, five or more. The set of microphones may comprise a third microphone for provision of a third microphone input signal also denoted m_3.

The hearing device may comprise a voice detector module. The voice detector module is configured to detect presence of voice, such as a user's own voice, based on one or more microphone input signals including the first microphone input signal and/or the second microphone input signal. The voice detector module may be embedded in the processor or form a separate unit. The voice detector module is connected to the first microphone and/or the second microphone for processing the first microphone input signal and/or the second microphone input signal, the voice detector module configured to detect own-voice of a user of the hearing device, e.g. based on one or more microphone input signals from microphones of the set of microphones.

In one or more example hearing devices, the hearing device comprises a set of microphones including a first microphone for provision of a first microphone input signal, and a second microphone for provision of a second microphone input signal; a voice detector module connected to the first microphone and the second microphone for processing the first microphone input signal and the second microphone input signal, the voice detector module configured to detect own-voice of a user of the hearing device; a processor for processing the first microphone input signal and the second microphone input signal for provision of an electrical output signal based on the first microphone input signal and the second microphone input signal; and a receiver for converting the electrical output signal to an audio output signal, wherein the voice detector module is configured to determine a direction parameter indicative of a direction of a sound source based on one or more microphone input signals from microphones of the set of microphones; determine whether a direction criterion based on the direction parameter is satisfied; determine a first distance parameter indicative of a distance to the sound source based on one or more microphone input signals from microphones of the set of microphones; determine whether a distance criterion based on the first distance parameter is satisfied; and in accordance with a determination that the direction criterion and the distance criterion are satisfied, provide a voice detector output indicative of detection of own-voice to the processor.

In one or more example hearing devices, to determine the first distance parameter comprises to determine two, three or more differential/gradient test signals based on the one or more microphone input signals, such as m_1, m_2, and m_3. For simplicity, the delay component may not be used in the subtraction as the low frequency region may be of interest, where near field effects are strong and the wavelength $\lambda \gg$ microphone spacing to satisfy the gradient microphone/differential condition.

In one or more example hearing devices, to determine the direction parameter comprises to determine a cross correlation between two microphone input signals, such as between the first microphone input signal from the first microphone and a contralateral first microphone input signal from a first microphone of a contralateral hearing device. In one or more examples, to determine the direction parameter comprises to determine a cross correlation between a test signal of the hearing device and a corresponding contralateral test signal from the contralateral hearing device. A high degree of correlation between two microphone input signals from microphones arranged symmetrically or substantially symmetrically in relation to the mouth may indicate that the microphone input signals represent audio from a center position or zero direction in relation to the user.

In one or more example hearing devices, to determine the first distance parameter comprises to determine a first test measure based on the first microphone input signal, and determine the first distance parameter based on the first test measure. The first test measure may be denoted SP_1.

In one or more example hearing devices, to determine a first test measure SP_1 comprises to determine a first test signal also denoted $s\_1(t)$ based on the first microphone input signal m_1. The first test measure SP_1 may be a power of the first test signal $s\_1(t)$. In other words, the first test measure may be a power spectrum of the first test signal.

In one or more example hearing devices, to determine the first distance parameter comprises to determine a second test measure based on the second microphone input signal, and determine the first distance parameter based on the second test measure. The second test measure may be denoted SP_2.

In one or more example hearing devices, to determine a second test measure comprises to determine a second test signal also denoted $s\_2(t)$ based on the second microphone input signal m_2. The second test measure SP_2 may be a power of the second test signal $s\_2(t)$. In other words, the second test measure may be a power spectrum of the second test signal.

In one or more example hearing devices, the second test signal s_2(t) is based on the first microphone input signal m_1. The second test signal may be based on a ratio or a difference between the second microphone input signal m_2 and the first microphone input signal m_1.

The second test signal s_2(t) may be a differential/gradient test signal and is optionally given as:

$$s\_2(t)=m\_2-m\_1 \text{ or } s\_2(t)=m\_1-m\_2,$$

where m_1 is the first microphone input signal and m_2 is the second microphone input signal. In one or more examples, the second test signal may be given as a linear combination of m_1 and m_2.

In one or more example hearing devices, the hearing device comprises a first housing configured as an earpiece housing to be worn in or at the ear canal of a user, and the first microphone is an in-ear microphone arranged in the first housing.

In one or more example hearing devices, the first microphone is a front BTE microphone or a rear BTE microphone arranged in the second housing.

In one or more example hearing devices, the hearing device comprises a second housing configured as a behind-the-ear housing to be worn behind the pinna of a user, and the second microphone is a behind-the-ear microphone, such as a front BTE microphone or a rear BTE microphone, arranged in the second housing.

In one or more example hearing devices, the first microphone is a front BTE microphone or a rear BTE microphone arranged in the second housing.

In one or more example hearing devices, the second microphone is an in-ear microphone arranged in the first housing or a rear BTE microphone arranged in the second housing.

In one or more example hearing devices, the set of microphones comprises a third microphone for provision of a third microphone input signal also denoted m_3. To determine the first distance parameter optionally comprises to determine a third test measure also denoted SP_3 based on the third microphone input signal. The third test measure may be based on one or more of the first microphone input signal, the second microphone input signal, and the third microphone input signal. The first distance parameter may be based on the third test measure. In other words, to determine the first distance parameter may comprise to determine the first distance parameter based on the third test measure.

In one or more example hearing devices, to determine a third test measure comprises to determine a third test signal also denoted s_3(t) based on the third microphone input signal m_3. The third test measure SP_3 may be a power of the third test signal s_3(t). In other words, the third test measure may be a power spectrum of the third test signal.

The third test signal s_3(t) may be a differential/gradient test signal and is optionally given as:

$$s\_3(t)=m\_2-m\_3 \text{ or } s\_3(t)=m\_3-m\_2,$$

where m_2 is the second microphone input signal and m_3 is the third microphone input signal. In one or more examples, the third test signal may be given as a linear combination of m_2 and m_3. The third test signal may be based on a ratio or a difference between the second microphone input signal m_2 and the third microphone input signal m_3.

In one or more example hearing devices, the first test signal s_1(t) may be a differential/gradient test signal and is optionally given as:

$$s\_1(t)=m\_3-m\_1 \text{ or } s\_1(t)=m\_1-m\_3,$$

wherein m_3 is the third microphone input signal and m_1 is the first microphone input signal. In other words, the first test signal may be based on the third microphone input signal. In one or more examples, the first test signal may be given as a linear combination of m_1 and m_3.

In one or more example hearing devices, the third microphone is a behind-the-ear microphone, such as a rear BTE microphone, arranged in the second housing, e.g. where the first microphone is an in-ear microphone arranged in the first housing and the second microphone is front BTE microphone arranged in the second housing.

In one or more example hearing devices, the third microphone is a front behind-the-ear microphone arranged in the second housing, e.g. where the first microphone is an in-ear microphone arranged in the first housing.

In one or more example hearing devices, the first distance parameter comprises a first primary distance parameter, e.g. associated with a primary frequency band, and/or a first secondary distance parameter associated with a secondary frequency band. To determine whether a distance criterion based on the first distance parameter is satisfied may comprise to determine whether a primary distance criterion based on the first primary distance parameter is satisfied and/or whether a secondary distance criterion based on the first secondary distance parameter is satisfied.

The first distance parameter also denoted DP_1 may be given as:

$$DP\_1 = 10\log10\left(\frac{SP\_2 * SP\_1}{SP\_3 * SP\_3}\right),$$

where SP_1, SP_2, and SP_3 are power spectra of respective first test signal s_1(t), second test signal s_2(t), and third test signal s_3(t).

The first distance parameter may be a spectrum, e.g. a vector comprising values, such as powers, representing frequency sub-bands, such as at least 3 frequency sub-bands, e.g. in the range from 5 to 20 frequency sub-bands. The first distance parameter may be a power spectrum vector with 10 frequency sub-bands.

The first primary distance parameter may be selected or determined as the first distance parameter at or associated with a primary frequency band. The primary frequency band may be in the range from 300 Hz to 900 Hz. The primary frequency band may have a primary center frequency less than 1 kHz, such as in the range from 400 Hz to 800 Hz, e.g. 600 Hz.

The first secondary distance parameter may be selected or determined as the first distance parameter at or associated with a secondary frequency band. The secondary frequency band may be in the range from 1.4 kHz to 2.0 kHz. The secondary frequency band may have a secondary center frequency larger than 1 kHz, such as in the range from 1.4 kHz to 2.0 kHz, e.g. 1.7 kHz.

In one or more example hearing devices, the hearing device comprises a transceiver, e.g. as part of wireless communication unit, connected to the voice detector module for receiving one or more contralateral input signals, e.g. including a first contralateral microphone input signal, from a contralateral hearing device. The direction criterion may be based on the first contralateral microphone input signal.

The first contralateral microphone input signal may be from a first contralateral microphone of the contralateral hearing device. The first contralateral microphone may be an in-ear microphone arranged in a first housing of the contralateral hearing device.

In one or more example hearing devices, the one or more contralateral input signals comprises a contralateral voice detector output indicative of a detection of own-voice in the contralateral hearing device, and wherein the voice detector output indicative of detection of own-voice is optionally based on the contralateral voice detector output. For example, the voice detector output may indicate presence of own voice in accordance with a determination that the direction criterion and the distance criterion are satisfied and that the contralateral voice detector output indicates detection of own voice. In other words, detection of own voice may require that the direction criterion and the distance criterion are satisfied in both the hearing device and the contralateral hearing device.

In one or more example hearing devices, the voice detector module is configured to determine a second distance parameter indicative of a distance to the sound source based on one or more microphone input signals, such as one or more of m_1, m_2 and m_3, from microphones of the set of microphones, and wherein the distance criterion is based on the second distance parameter.

In one or more example hearing devices, the second distance parameter comprises a second primary distance parameter, e.g. associated with a primary frequency band, and/or a second secondary distance parameter associated with a secondary frequency band. To determine whether a distance criterion based on the second distance parameter is satisfied may comprise to determine whether a primary distance criterion based on the second primary distance parameter is satisfied and/or whether a secondary distance criterion based on the second secondary distance parameter is satisfied.

The second distance parameter also denoted DP_2 may be given as:

$$DP\_2 = 10\log 10\left(\frac{SP\_2 + SP\_1}{SP\_3}\right),$$

where SP_1, SP_2, and SP_3 are power spectra of respective first test signal s_1(t), second test signal s_2(t), and third test signal s_3(t).

The second distance parameter may be a spectrum, e.g. a vector comprising values, such as powers, representing frequency sub-bands, such as at least 3 frequency sub-bands, e.g. in the range from 5 to 20 frequency sub-bands. The second distance parameter may be a power spectrum vector with 10 frequency sub-bands.

The second primary distance parameter may be selected or determined as the second distance parameter at or associated with a primary frequency band. The primary frequency band may be in the range from 300 Hz to 900 Hz. The primary frequency band may have a primary center frequency less than 1 kHz, such as in the range from 400 Hz to 800 Hz, e.g. 600 Hz.

The second secondary distance parameter may be selected or determined as the second distance parameter at or associated with a secondary frequency band. The secondary frequency band may be in the range from 1.4 kHz to 2.0 kHz. The secondary frequency band may have a secondary center frequency larger than 1 kHz, such as in the range from 1.4 kHz to 2.0 kHz, e.g. 1.7 kHz.

In one or more exemplary hearing devices, the hearing device comprises a set of microphones including a first microphone for provision of a first microphone input signal, and a second microphone for provision of a second microphone input signal; a voice detector module connected to the first microphone and the second microphone for processing the first microphone input signal and the second microphone input signal, the voice detector module configured to detect own-voice of a user of the hearing device; a processor for processing the first microphone input signal and the second microphone input signal for provision of an electrical output signal based on the first microphone input signal and the second microphone input signal; and a receiver for converting the electrical output signal to an audio output signal, wherein the voice detector module is configured to determine a first distance parameter indicative of a distance to the sound source based on one or more microphone input signals from microphones of the set of microphones; provide a voice detector output indicative of detection of own-voice to the processor, wherein to provide a voice detector output indicative of detection of own-voice comprises to apply a machine learning model taking the first distance parameter as input and providing as output the voice detector output indicative of detection of own-voice.

In one or more exemplary hearing devices, the voice detector module is configured to determine a second distance parameter indicative of a distance to the sound source based on one or more microphone input signals from microphones of the set of microphones, and wherein the machine learning model takes the first distance parameter and the second distance parameter as input.

In one or more exemplary hearing devices, the voice detector module is configured to determine a direction parameter indicative of a direction of a sound source based on one or more microphone input signals from microphones of the set of microphones, and wherein the machine learning model takes the direction parameter as input.

In one or more example hearing devices, the processor may be connected to the voice detector module, wherein the processor is configured for processing the first microphone input signal and the second microphone input signal for provision of an electrical output signal based on the voice detector output indicative of detection of own-voice. For example, the processor may be configured to adjust amplification of the first microphone input signal and/or the second microphone input signal in dependence of a detection of own-voice, e.g. by reducing one or more gains when own voice is detected.

In one or more example hearing devices, the processor may be configured to adjust beamforming of the first microphone input signal and/or the second microphone input signal in dependence of a detection of own-voice, e.g. by increasing the bandwidth of the beamforming when own voice is not detected and/or reducing the bandwidth of the beamforming when own voice is detected.

The machine learning model may be a Gaussian distribution model trained on a large set of near-field and far-field first distance parameters.

In one or more example hearing devices, the processor may be configured to control a vent assembly of the hearing device in dependence of a detection of own-voice, e.g. by increasing the venting when own voice is detected and/or reducing the venting when own voice is not detected.

FIG. 1 shows an example hearing device 2, such as a first hearing device 2A and/or second hearing device 2B, according to the present disclosure. The hearing device 2 is a hearing aid of the MaRiE type and comprises a first housing 4 configured as an earpiece housing to be worn in or at the ear canal of a user and a second housing 6 configured as a behind-the-ear housing to be worn behind the pinna of a user. The hearing device 2 comprises a set of microphones including a first microphone 8 for provision of a first microphone input signal 8A also denoted m_1, a second microphone 10 for provision of a second microphone input signal 10A also denoted m_2, and third microphone 12 for provision of a third microphone input signal 12A. The hearing device 2 comprises a voice detector module 14 connected to microphones 8, 10, 12 for processing the microphone input signals 8A, 10A, 12A, the voice detector module configured to detect own-voice of a user of the hearing device; a processor 16 for processing the first microphone input signal 8A and the second microphone input signal 10A for provision of an electrical output signal 16A based on the first microphone input signal 8A and the second microphone input signal 10A; and a receiver 18 for converting the electrical output signal 16A to an audio output signal.

The hearing devices 2 comprises a wireless communication unit 20 including a transceiver 22 and an antenna 24 coupled to the transceiver 22. The wireless communication unit 18 is configured for wireless communication as indicated by arrow 26, e.g. with a contralateral hearing device. The transceiver 22/wireless communication unit 18 is configured to convert wireless input signal(s) including one or more contralateral input signals 27 to one or more transceiver input signals 28 including a first contralateral microphone input signal 28A.

The processor 16 is configured to process one or more input signals 8A, 10A, 12A, 28 and provide the electrical output signal 16A based on one or more of input signals 8A, 10A, 12A, 28.

The voice detector module 14 is configured to provide a voice detector output 14A indicative of detection of own-voice to the processor 16. The processor 16 is configured to control processing of input signals 8A, 10A, 12A, 28 based on the voice detector output 14A. In other words, the voice detector output 14A is a control signal.

Optionally, the hearing device 2 comprises a button 30 for receiving user input from a user.

Figure 2:
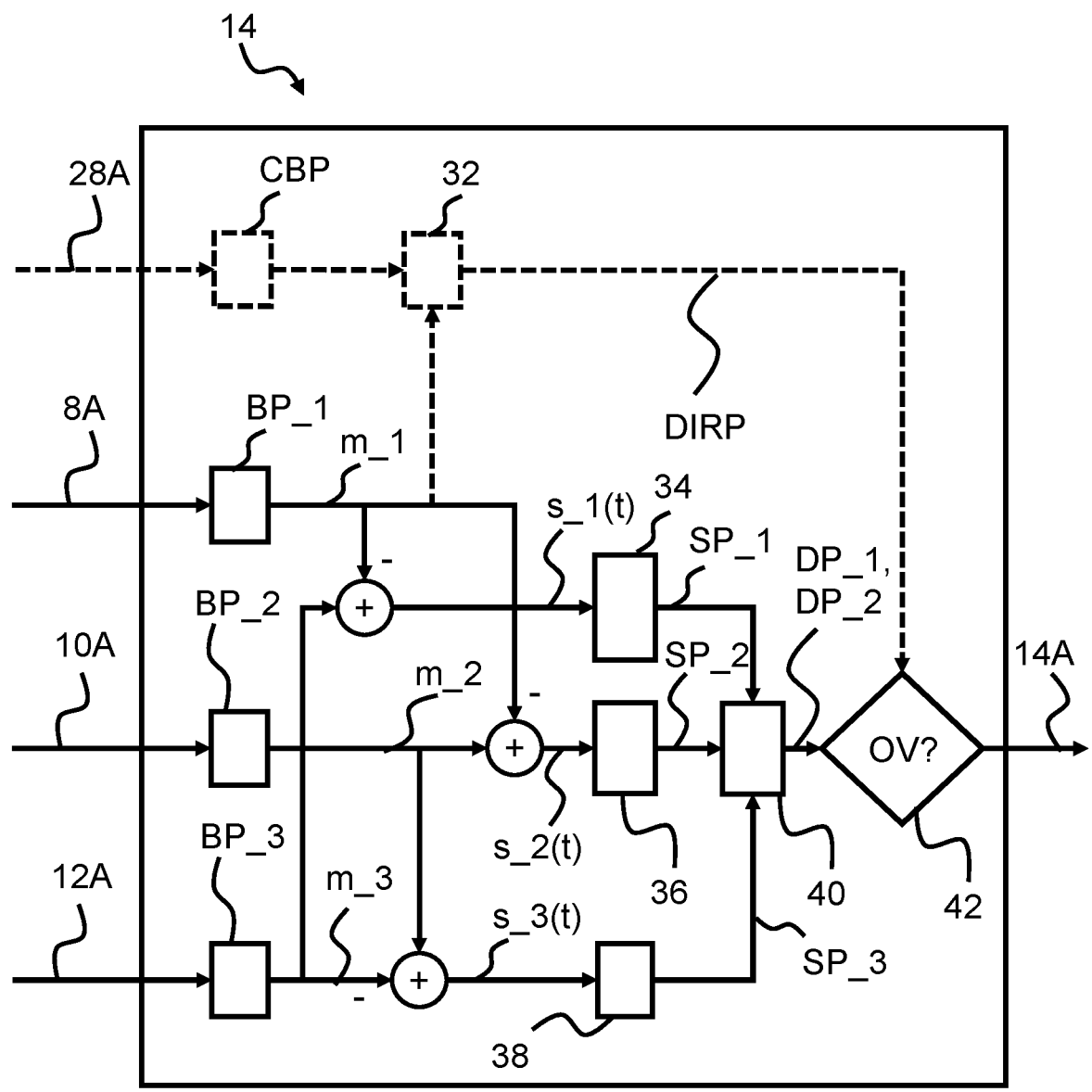

FIG. 2 shows an example voice detector module. The voice detector module 14 comprises band pass filters BP_1, BP_2, BP_3, CBP for bandpass filtering respective microphone input signals 8A, 10A, 12A and contralateral microphone input signal 28A. The voice detector module 14 comprises a correlator or direction determiner 32 configured to determine and output a direction parameter DIRP indicative of a direction of a sound source based on the first microphone input signal 8A and contralateral microphone input signal 28A, e.g. by cross-correlating first microphone input signal 8A and contralateral microphone input signal 28A. A low or no time difference between the first microphone input signal 8A and contralateral microphone input signal 28A as indicated by DIRP can be used for determining if the sound source is being centered in front of the user, i.e. if the sound is own voice.

Further, the voice detector module 14 is configured to determine a first distance parameter DP_1 indicative of a distance to the sound source based on one or more microphone input signals from microphones of the set of microphones by determining first test measure SP_1, second test measure SP_2, and third test measure SP_3 in respective first determiner 34 or block, second determiner 36 or block, and third determiner 38 or block, the test measures SP_1, SP_2, SP_3 indicating powers of respective first test signal s_1($t$), second test signal s_2($t$), and third test signal s_3($t$), respectively. The test measures SP_i, i=1, 2, 3 may be given as the total power in one or more frequency bands of the test signals s_i(t). In other words, the voice detector module 14 comprises a distance parameter determiner 40 or block configured to determine one or more distance parameters, such as the first distance parameter DP_1 and/or the second distance parameter DP_2.

The voice detector module 14 is configured to, in criteria determiner 42 or block, determine whether a distance criterion based on the first distance parameter is satisfied, e.g. if the first distance parameter meets one or more thresholds. For example, the distance criterion may be satisfied if a first primary distance parameter of the first distance parameter meets a first primary threshold and/or a first secondary distance parameter of the first distance parameter meets a first secondary threshold.

Alternatively or in combination, the voice detector module 14 may be configured to determine whether a distance criterion based on the second distance parameter is satisfied, e.g. if the second distance parameter meets one or more thresholds. For example, the distance criterion may be satisfied if a second primary distance parameter of the second distance parameter meets a second primary threshold and/or a second secondary distance parameter of the second distance parameter meets a second secondary threshold.

The voice detector module 14 is configured to, in accordance with a determination that the direction criterion and the distance criterion are satisfied, provide a voice detector output indicative of detection of own-voice to the processor, e.g. "1" when own-voice is detected and "0" when own-voice is not detected.

The first test signal s_1($t$) is be given as s_1($t$)=m_3−m_1, where m_1 is the first microphone input signal or a bandpass filtered first microphone input signal, and m_3 is the third microphone input signal or a bandpass filtered third microphone input signal The second test signal s_2($t$) is given as s_2($t$)=m_2-$m$_1, where m_1 is the first microphone input signal or a bandpass filtered first microphone input signal, and m_2 is the second microphone input signal or a bandpass filtered second microphone input signal.

The third test signal s_3($t$) is given as s_3($t$)=m_2−m_3, where m_2 is the second microphone input signal or a bandpass filtered second microphone input signal, and m_3 is the third microphone input signal or a bandpass filtered third microphone input signal.

Figure 3:
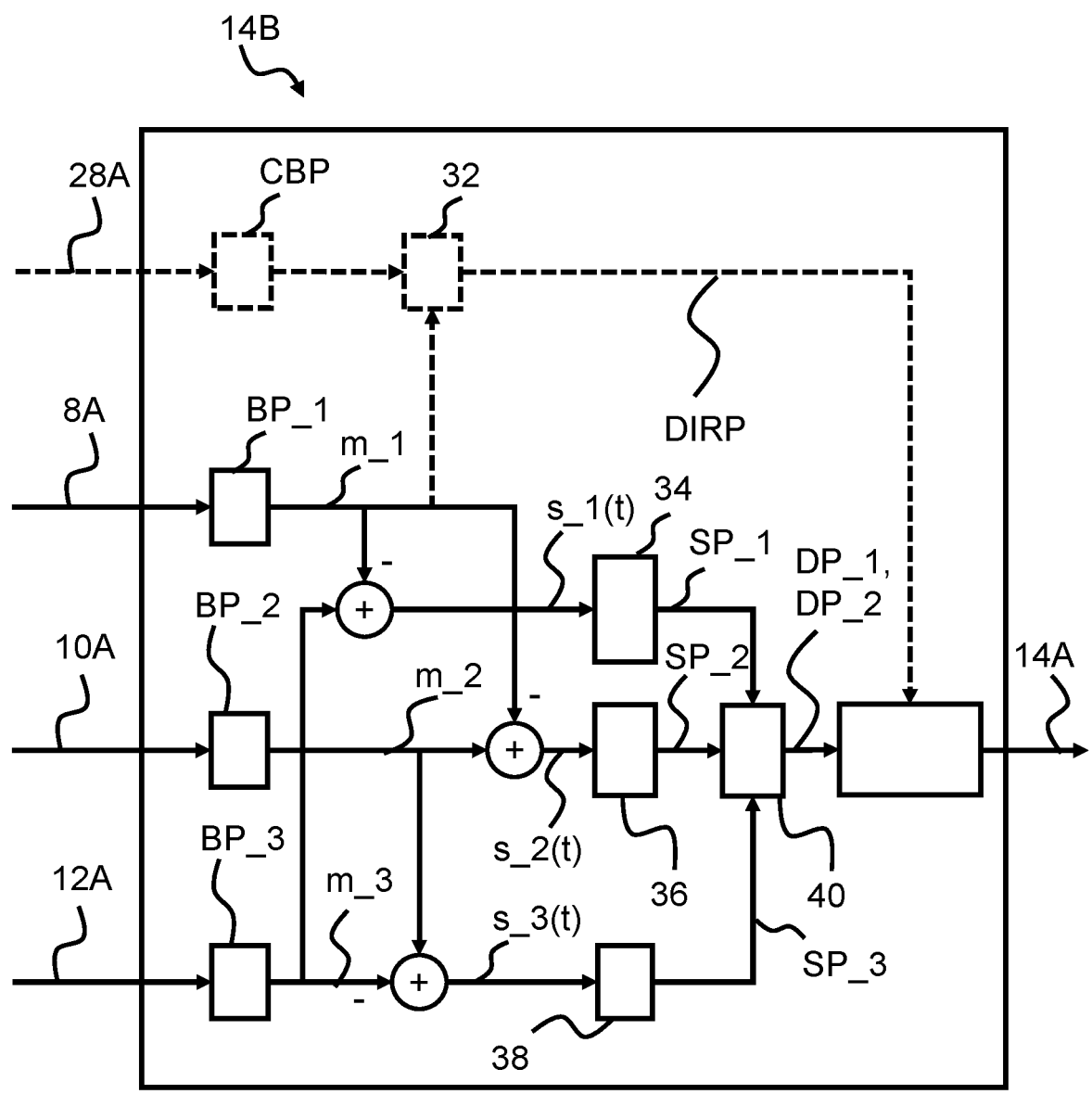

FIG. 3 shows an example voice detector module. The voice detector module 14B comprises an ML block or model 44 taking one or more of the first distance parameter DP_1, the second distance parameter DP_2, and the direction parameter DIRP as input and providing as output a voice detector output 14A indicative of detection of own-voice.

Figure 4:
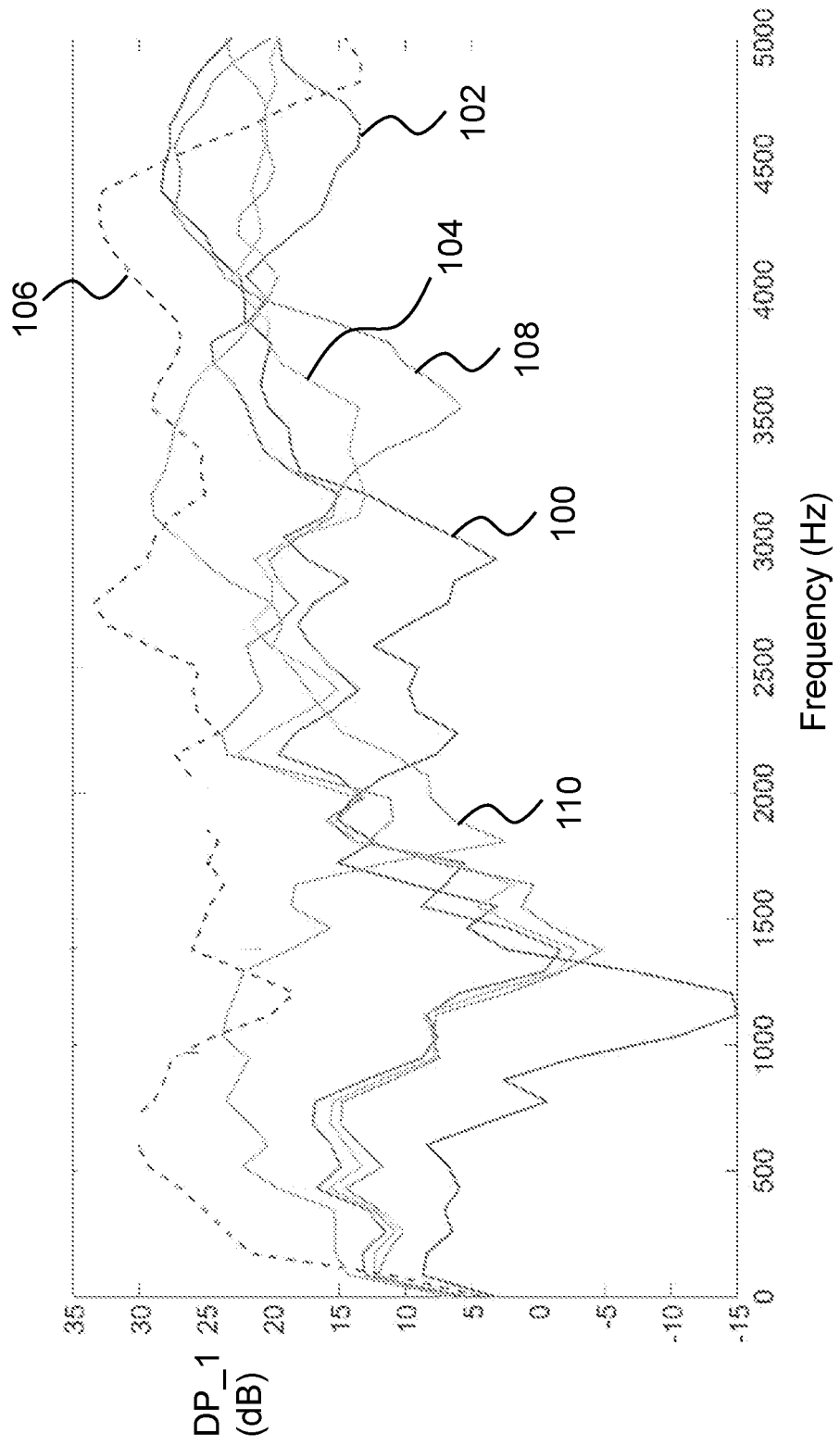
FIG. 4 illustrates spectral curves for different sources.

FIG. 4 shows spectral curves of first distance parameter DP_1 for different sources, where curve 100 is a far field source with 75 degrees elevation and 0 degrees azimuth, curve 102 is a far field source with 90 degrees elevation and −15 degrees azimuth, curve 104 is a far field source with 90 degrees elevation and 0 degrees azimuth, dotted curve 106 is a near field source with 90 degrees elevation and 0 degrees azimuth, curve 108 is a far field source with 90 degrees elevation and 15 degrees azimuth, and curve 110 is a far field source with 105 degrees elevation and 0 degrees azimuth. The curve in FIG. 3 clearly shows that voice detection based on first distance parameter allows to distinguish between near field source (own voice) and far field source (other talker).

It is to be understood that a description of a feature in relation to a hearing device is also applicable to the corresponding method(s) of operating a hearing device and vice versa.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-3 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the example embodiments may be implemented at least in part by means of both hardware and software, and that several "means", "units" or "devices" may be represented by the same item of hardware.

The various example methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The following items disclose one or more features described herein:

Item 1. A hearing device comprising:
 a set of microphones including a first microphone for provision of a first microphone input signal, and a second microphone for provision of a second microphone input signal;
 a voice detector module connected to the first microphone and the second microphone for processing the first microphone input signal and the second microphone input signal, the voice detector module configured to detect own-voice of a user of the hearing device;
 a processor for processing the first microphone input signal and the second microphone input signal for provision of an electrical output signal based on the first microphone input signal and the second microphone input signal; and
 a receiver for converting the electrical output signal to an audio output signal, wherein the voice detector module is configured to:
 determine a direction parameter indicative of a direction of a sound source based on one or more microphone input signals from microphones of the set of microphones;
 determine whether a direction criterion based on the direction parameter is satisfied;
 determine a first distance parameter indicative of a distance to the sound source based on one or more microphone input signals from microphones of the set of microphones;
 determine whether a distance criterion based on the first distance parameter is satisfied; and
 in accordance with a determination that the direction criterion and the distance criterion are satisfied, provide a voice detector output indicative of detection of own-voice to the processor.

Item 2. Hearing device according to Item 1, wherein to determine the first distance parameter comprises:
 determine a first test measure based on the first microphone input signal, and determine the first distance parameter based on the first test measure.

Item 3. Hearing device according to Item 2, wherein to determine a first test measure comprises to determine a first test signal based on the first microphone input signal, and determine the first test measure as a power of the first test signal.

Item 4. Hearing device according to any one of Items 2-3, wherein to determine the first distance parameter comprises to determine a second test measure based on the second microphone input signal, and determine the first distance parameter based on the second test measure.

Item 5. Hearing device according to Item 4, wherein to determine a second test measure comprises to determine a second test signal based on the second microphone input signal, and determine the second test measure as a power of the second test signal.

Item 6. Hearing device according to Item 5, wherein the second test signal is based on the first microphone input signal.

Item 7. Hearing device according to any one of Items 1-6, wherein the hearing device comprises a first housing configured as an earpiece housing to be worn in or at the ear canal of a user, and the first microphone is an in-ear microphone arranged in the first housing.

Item 8. Hearing device according to any one of Items 1-7, wherein the hearing device comprises a second housing configured as a behind-the-ear housing to be worn behind the pinna of a user, and the second microphone is a behind-the-ear microphone arranged in the second housing.

Item 9. Hearing device according to any one of Items 1-8, wherein the set of microphones comprises a third microphone for provision of a third microphone input signal, and wherein to determine the first distance parameter comprises to determine a third test measure based on the third microphone input signal, and determine the first distance parameter based on the third test measure.

Item 10. Hearing device according to Item 9, wherein to determine a third test measure comprises to determine a third test signal based on the third microphone input signal, and determine the third test measure as a power of the third test signal.

Item 11. Hearing device according to any one of Items 9-10, wherein the third microphone is a behind-the-ear microphone arranged in the second housing.

Item 12. Hearing device according to any one of Items 1-11, wherein the first distance parameter comprises a first primary distance parameter associated with a primary frequency band and a first secondary distance parameter associated with a secondary frequency band, and wherein to determine whether a distance criterion based on the first distance parameter is satisfied comprises to determine whether a primary distance criterion based on the first primary distance parameter is satisfied and whether a secondary distance criterion based on the first secondary distance parameter is satisfied.

Item 13. Hearing device according to any of Items 1-12, wherein the hearing device comprises a transceiver connected to the voice detector module for receiving one or more contralateral input signals from a contralateral hearing device, and wherein the direction criterion is based on a first contralateral microphone input signal from a first contralateral microphone of the contralateral hearing device.

Item 14. Hearing device according to Item 13, wherein the one or more contralateral input signals comprises a contralateral voice detector output indicative of a detection of own-voice in the contralateral hearing device, and wherein the voice detector output indicative of detection of own-voice is based on the contralateral voice detector output.

Item 15. Hearing device according to any of Items 1-14, wherein the voice detector module is configured to determine a second distance parameter indicative of a distance to the sound source based on one or more microphone input signals from microphones of the set of microphones, and wherein the distance criterion is based on the second distance parameter.

Item 16. A hearing device comprising:
- a set of microphones including a first microphone for provision of a first microphone input signal, and a second microphone for provision of a second microphone input signal;
- a voice detector module connected to the first microphone and the second microphone for processing the first microphone input signal and the second microphone input signal, the voice detector module configured to detect own-voice of a user of the hearing device;
- a processor for processing the first microphone input signal and the second microphone input signal for provision of an electrical output signal based on the first microphone input signal and the second microphone input signal; and
- a receiver for converting the electrical output signal to an audio output signal, wherein the voice detector module is configured to:
- determine a first distance parameter indicative of a distance to the sound source based on one or more microphone input signals from microphones of the set of microphones;
- provide a voice detector output indicative of detection of own-voice to the processor, wherein to provide a voice detector output indicative of detection of own-voice comprises to apply a machine learning model taking the first distance parameter as input and providing as output the voice detector output indicative of detection of own-voice.

Item 17. Hearing device according to Item 16, wherein the voice detector module is configured to determine a second distance parameter indicative of a distance to the sound source based on one or more microphone input signals from microphones of the set of microphones, and wherein the machine learning model takes the first distance parameter and the second distance parameter as input.

Item 18. Hearing device according to any of Items 16-17, wherein the voice detector module is configured to determine a direction parameter indicative of a direction of a sound source based on one or more microphone input signals from microphones of the set of microphones, and wherein the machine learning model takes the direction parameter as input.

Item 19. Hearing system comprising a first hearing device and a second hearing device, wherein the first hearing device is a hearing device according to any one of Items 1-18 and the second hearing device is a hearing device according to any one of Items 1-18.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES 2 hearing device
2A first hearing device
2B second hearing device
4 first housing
6 second housing
8 first microphone
8A first microphone input signal
10 second microphone
10A second microphone input signal
12 third microphone
12A third microphone input signal
13 memory
14 voice detector module
14A voice detector output
16 processor/processing unit
16A electrical output signal
18 receiver
20 wireless communication unit
22 transceiver
24 antenna
26 wireless communication
27 one or more contralateral input signals 28 transceiver input signals
28A contralateral microphone input signal
30 button
32 correlator, direction determiner
34 first determiner
36 second determiner
38 third determiner
40 distance parameter determiner
42 criteria determiner
44 machine learning model

The invention claimed is:

1. A hearing device comprising:
a set of microphones including a first microphone for provision of a first microphone input signal, and a second microphone for provision of a second microphone input signal;
a voice detector module connected to the first microphone and the second microphone, wherein the voice detector is configured to process the first microphone input signal and the second microphone input signal, and to detect own-voice of a user of the hearing device;
a processing unit configured to provide an electrical output signal based on the first microphone input signal and the second microphone input signal; and
a receiver configured to provide an audio output signal based on the electrical output signal;
wherein the voice detector module is configured to:
determine a direction parameter indicative of a direction of a sound source based on the first microphone input signal and/or the second microphone input signal;
determine whether a direction criterion is satisfied based on the direction parameter;
determine a first distance parameter indicative of a distance to the sound source based on the first microphone input signal and/or the second microphone input signal;
determine whether a distance criterion is satisfied based on the first distance parameter; and
provide a voice detector output indicative of a detection of the own-voice of the user based on a determination that the direction criterion and the distance criterion are satisfied.

2. The hearing device according to claim 1, wherein the voice detector module is configured to determine the first distance parameter by:
determining a first test measure based on the first microphone input signal, and
determining the first distance parameter based on the first test measure.

3. The hearing device according to claim 2, wherein the voice detector module is configured to determine the first test measure by determining a test signal based on the first microphone input signal, and determining a power of the test signal as the first test measure.

4. The hearing device according to claim 2, wherein the voice detector module is configured to determine the first distance parameter also by:
determining a second test measure based on the second microphone input signal, and
determining the first distance parameter based on the second test measure.

5. The hearing device according to claim 4, wherein the voice detector module is configured to determine the second test measure by determining a test signal based on the second microphone input signal, and determining a power of the test signal as the second test measure.

6. The hearing device according to claim 5, wherein voice detector module is configured to determine the test signal also based on the first microphone input signal.

7. The hearing device according to claim 4, wherein the set of microphones comprises a third microphone for provision of a third microphone input signal; and
wherein the voice detector module is configured to determine the first distance parameter by determining a third test measure based on the third microphone input signal, and determining the first distance parameter based on the third test measure.

8. The hearing device according to claim 7, wherein the voice detector module is configured to determine the third test measure by determining a test signal based on the third microphone input signal, and determining a power of the test signal as the third test measure.

9. The hearing device according to claim 7, wherein the third microphone is a behind-the-ear microphone in a behind-the-ear housing.

10. The hearing device according to claim 1, further comprising an earpiece housing configured to be worn in an ear canal or at an ear of the user, wherein the first microphone is an in-ear microphone in the earpiece housing.

11. The hearing device according to claim 1, further comprising a behind-the-ear housing configured to be worn behind a pinna of the user, wherein the second microphone is a behind-the-ear microphone in the behind-the-ear housing.

12. The hearing device according to claim 1, wherein the first distance parameter comprises a first primary distance parameter associated with a primary frequency band and a first secondary distance parameter associated with a secondary frequency band, and wherein the voice detector module is configured to determine whether the distance criterion is satisfied by determining whether a primary distance criterion is satisfied based on the first primary distance parameter, and whether a secondary distance criterion is satisfied based on the first secondary distance parameter.

13. The hearing device according to claim 1, further comprising a transceiver connected to the voice detector module, wherein the transceiver is configured to receive one or more contralateral input signals from a contralateral hearing device.

14. The hearing device according to claim 1, wherein the voice detector module is configured to determine a second distance parameter, and wherein the voice detector module is configured to determine whether the distance criterion is satisfied based on the second distance parameter.

15. A hearing system comprising a first hearing device and a second hearing device, wherein the first hearing device is a hearing device according to claim 1, and the second hearing device is another hearing device according to claim 1.

16. The hearing device according to claim 1, wherein the voice detector module is configured to apply a machine learning model, and wherein the machine learning model is configured to obtain the first distance parameter, and to provide the voice detector output indicative of the detection of the own-voice of the user.

17. A hearing device comprising:
a set of microphones including a first microphone for provision of a first microphone input signal, and a second microphone for provision of a second microphone input signal;
a voice detector module connected to the first microphone and the second microphone, wherein the voice detector is configured to process the first microphone input signal and the second microphone input signal, and to detect own-voice of a user of the hearing device;

a processing unit configured to provide an electrical output signal based on the first microphone input signal and the second microphone input signal; and a receiver configured to provide an audio output signal based on the electrical output signal;

wherein the voice detector module is configured to:
  determine a direction parameter indicative of a direction of a sound source based on the first microphone input signal and/or the second microphone input signal;
  determine whether a direction criterion is satisfied based on the direction parameter;
  determine a first distance parameter indicative of a distance to the sound source based on the first microphone input signal and/or the second microphone input signal;
  determine whether a distance criterion is satisfied based on the first distance parameter; and
  provide a voice detector output indicative of a detection of the own-voice of the user based on a determination that the direction criterion and the distance criterion are satisfied;

wherein the hearing device further comprises a transceiver connected to the voice detector module, wherein the transceiver is configured to receive one or more contralateral input signals from a contralateral hearing device; and wherein the one or more contralateral input signals comprise a first contralateral microphone of the contralateral hearing device, and wherein the voice detector module is configured to determine whether the direction criterion is satisfied based also on the first contralateral microphone input signal from the first contralateral microphone of the contralateral hearing device.

18. A hearing device comprising:
a set of microphones including a first microphone for provision of a first microphone input signal, and a second microphone for provision of a second microphone input signal;
a voice detector module connected to the first microphone and the second microphone, wherein the voice detector is configured to process the first microphone input signal and the second microphone input signal, and to detect own-voice of a user of the hearing device;
a processing unit configured to provide an electrical output signal based on the first microphone input signal and the second microphone input signal; and
a receiver configured to provide an audio output signal based on the electrical output signal;
wherein the voice detector module is configured to:
  determine a direction parameter indicative of a direction of a sound source based on the first microphone input signal and/or the second microphone input signal;
  determine whether a direction criterion is satisfied based on the direction parameter;
  determine a first distance parameter indicative of a distance to the sound source based on the first microphone input signal and/or the second microphone input signal;
  determine whether a distance criterion is satisfied based on the first distance parameter; and
  provide a voice detector output indicative of a detection of the own-voice of the user based on a determination that the direction criterion and the distance criterion are satisfied;
wherein the hearing device further comprises a transceiver connected to the voice detector module, wherein the transceiver is configured to receive one or more contralateral input signals from a contralateral hearing device; and
wherein the one or more contralateral input signals comprises a contralateral voice detector output indicative of an own-voice detection by the contralateral hearing device, and wherein the voice detector output is based on the contralateral voice detector output.

19. A hearing device comprising:
a set of microphones including a first microphone for provision of a first microphone input signal, and a second microphone for provision of a second microphone input signal;
a voice detector module connected to the first microphone and the second microphone, wherein the voice detector is configured to process the first microphone input signal and the second microphone input signal, and to detect own-voice of a user of the hearing device;
a processing unit configured to provide an electrical output signal based on the first microphone input signal and the second microphone input signal; and
a receiver configured to provide an audio output signal based on the electrical output signal;
wherein the voice detector module is configured to:
  determine a first distance parameter indicative of a distance to a sound source based on the first microphone input signal and/or the second microphone input signal; and
  provide a voice detector output indicative of detection of the own-voice, wherein the voice detector module is configured to apply a machine learning model, the machine learning model being configured to obtain the first distance parameter as input, and to provide the voice detector output indicative of the detection of the own-voice.

20. The hearing device according to claim 19, wherein the voice detector module is configured to determine a second distance parameter, and wherein the machine learning model is configured to obtain the first distance parameter and the second distance parameter as input.

21. The hearing device according to claim 19, wherein the voice detector module is configured to determine a direction parameter indicative of a direction of the sound source based on the first microphone input signal and/or the second microphone input signal, and wherein the machine learning model is configured to obtain the direction parameter as input.

* * * * *